United States Patent [19]
Holt et al.

[11] Patent Number: 6,159,316
[45] Date of Patent: Dec. 12, 2000

[54] METHOD OF MAKING MULTI-POCKET FILTER

[75] Inventors: Clive John Holt, Lancashire, United Kingdom; Charles Wilson Ridgeway, Windsor, Calif.

[73] Assignee: Filtration Group Incorporated, Joliet, Ill.

[21] Appl. No.: 09/229,268

[22] Filed: Jan. 13, 1999

[30] Foreign Application Priority Data

Jan. 16, 1998 [GB] United Kingdom .................... 9801012
Nov. 9, 1998 [GB] United Kingdom .................... 9824538

[51] Int. Cl.[7] ..................................................... B32B 31/16
[52] U.S. Cl. ......................... 156/73.1; 156/201; 156/267; 156/269
[58] Field of Search ................... 156/73.1, 196, 156/199, 200, 201, 250, 251, 267, 269

[56] References Cited

U.S. PATENT DOCUMENTS

| | | | |
|---|---|---|---|
| 2,213,602 | 9/1940 | Yates | 93/3 |
| 2,224,753 | 12/1940 | Yates | 93/3 |
| 2,350,930 | 6/1944 | Salfisberg | 93/3 |
| 3,319,539 | 5/1967 | Johnson et al. | 93/20 |
| 3,468,731 | 9/1969 | Obeda | 156/73.1 |
| 3,599,388 | 8/1971 | Feingold | 53/29 |
| 4,164,400 | 8/1979 | Wald | 55/382 |
| 4,356,011 | 10/1982 | Day et al. | 55/368 |
| 4,512,136 | 4/1985 | Christine | 53/410 |
| 4,539,793 | 9/1985 | Malek | 53/469 |
| 5,181,365 | 1/1993 | Garvey et al. | 53/455 |
| 5,215,609 | 6/1993 | Sanders | 156/70 |
| 5,846,360 | 12/1998 | Gil | 156/73.1 |
| 5,885,409 | 3/1999 | Gil | 156/580.2 |
| 5,891,208 | 4/1999 | Gil | 55/482 |

*Primary Examiner*—James Sells
*Attorney, Agent, or Firm*—Vedder, Price, Kaufman & Kammholz

[57] ABSTRACT

A filter element, as in a filter bag, comprises a pocket having partitions between the side walls to form pocket portions. The margins of the partitions are welded ultrasonically to the inner surface of the layers. The inlet end of the partitions may be split into flaps to ease connection of the bag to a header frame. A simple yet effective method and apparatus may be utilizable to make the filter element, and a bag including it.

7 Claims, 5 Drawing Sheets

METHOD OF MAKING MULTI-POCKET FILTER

BACKGROUND AND SUMMARY OF THE INVENTION

The invention relates to the filtration of gases, typically of air to remove dust particles. The particles may range from about 0.3 to about 30 micron in size.

It is known to make a gas filter bag from gas permeable natural material in the form of generally parallel pockets. The pockets have an open upstream inlet and a closed bottom end, the intention being that the dust particles will be trapped in the closed end of the pockets as the gas flow passes therethrough. The pockets may be defined by longitudinal seams formed by stitching. Usually a hot melt adhesive is applied over the stitched holes to seal them to avoid escape of particles. This is a labour intensive manufacturing method and the gas entrapment properties are not very good. It is one object of the invention to provide a gas filter of improved performance.

According to the invention in one aspect there is provided a gas filter element comprising two side walls forms of gas permeable material joined along three of their sides to define a pocket having an upstream open inlet and a downstream closed end, characterised in that generally parallel partitions bridge the opposite side walls to define individual pocket portions extending from the inlet end to the closed end, marginal portions of the partitions being secured to the inside of the side walls, whereby in use the air filter element exhibits a low pressure drop and a high degree of dust efficiency and dust holding capacity.

The walls may be made of any suitable material which may be wholly or mainly synthetic fibres. Because the partitions are joined to the walls by a welding process, the material should be fusible (or at least thereof should be).

Preferably the partition is a thin generally planar strip of fusible material which in use presents a narrow edge to the flow of air.

Preferably the marginal portions are secured to the inner surface of the side walls by ultrasonic welding.

Preferably a short length portion of one edge of the partition adjacent the open inlet end is not joined to the inner surface of the adjacent wall to permit flexure of the front end of the pocket so that it may easily be mounted in say a filter header frame. Alternatively and more preferably an elongate slit is formed in the upstream end portion of the partition to provide two flaps which enable the pocket to be opened in the manner of a jaw to engage the frame. The length and shape of the slit will be determined according to each filter element and frame, which typically is a header frame.

In another aspect the invention provides a continuous method of making a succession of pockets for a gas filter element, the method comprising:

advancing two elongate webs of synthetic fibre material to a work station to lie on opposite sides of an ultrasonic welding unit;

advancing parallel strips of fusible material to extend generally parallel to each other and to be positioned between the webs and substantially at right angles to the major axis of the webs;

passing the strips through a former to fold up the longitudinal marginal portions so that the marginal portions lie on the inner surface of the respective webs;

passing the webs and the marginal portions through the ultrasonic welding unit so as to ultrasonically weld the marginal portions to the respective web and so connect each side of the strip to the webs to form bridging portions in between the webs;

sealing the side portions of the webs;

cutting across the sealing the side sealed webs to form a closed end of the gas filter element and separate it from the webs.

BRIEF DESCRIPTION OF THE DRAWINGS

In order that the invention may be well understood it will now be described by way of example only with reference to the accompanying diagrammatic drawings, in which.

DETAILED DESCRIPTION OF THE DRAWINGS

Figure 1:
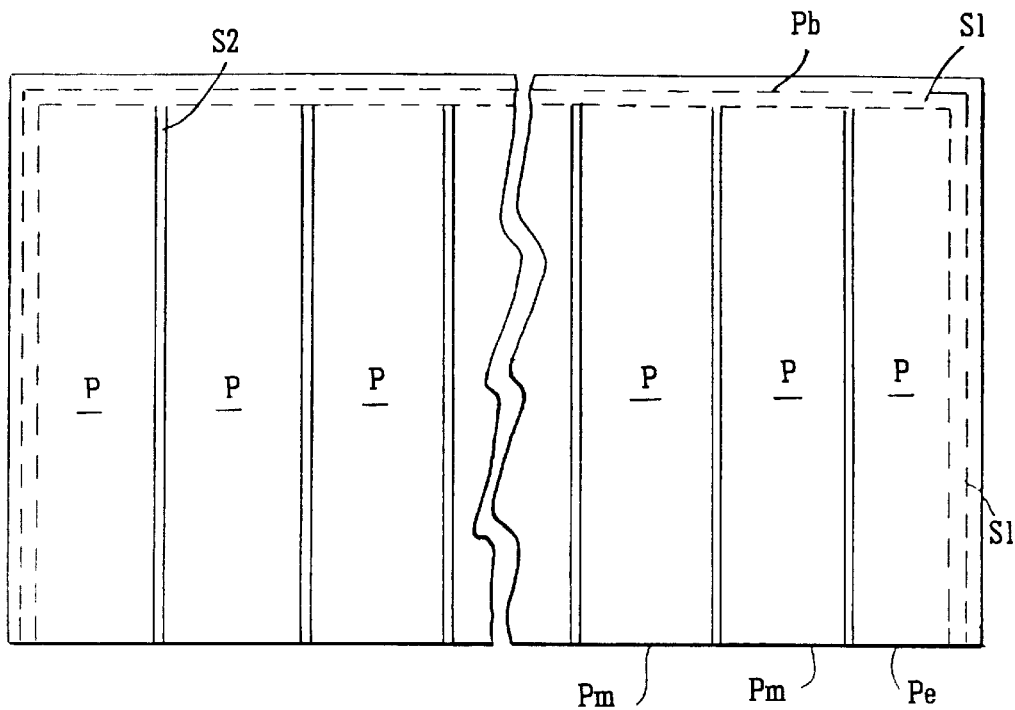
FIG. 1 is a plan view of one filter bag of the invention.

The same reference numerals are used where convenient in describing the different embodiments.

Figure 2:
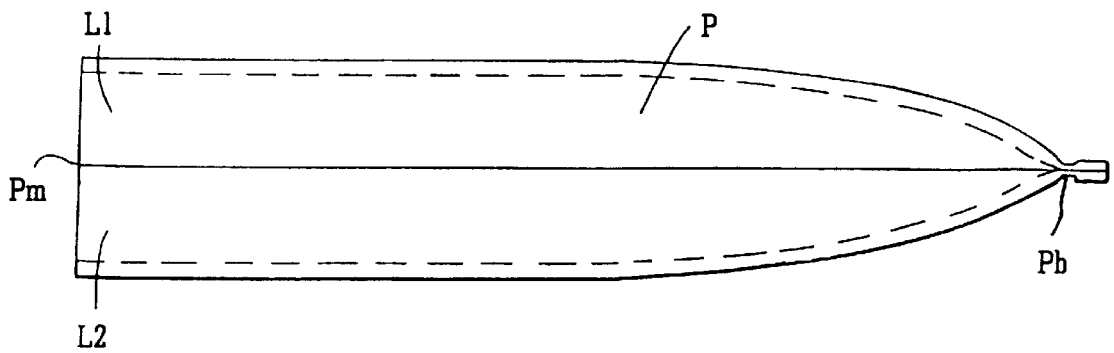
FIG. 2 is a side elevation of the filter bag of FIG. 1.
Figure 3:
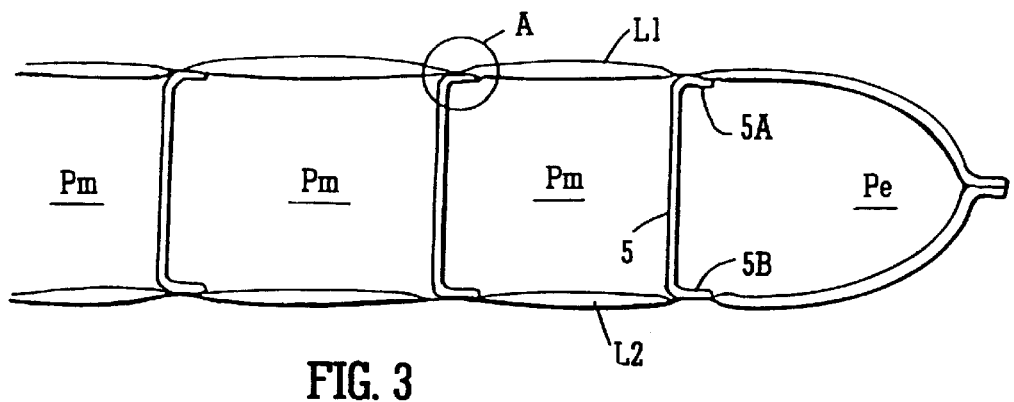
FIG. 3 is a partial front elevation of the pocket of the filter bag of FIG. 1 drawn to a much enlarged scale.
Figure 4:
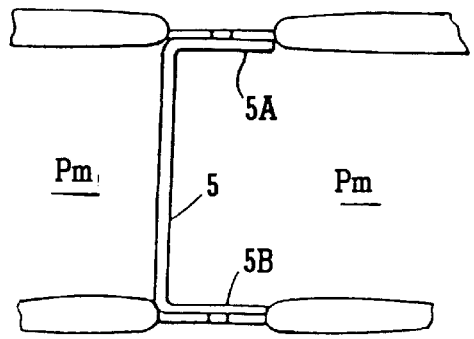
FIG. 4 is a much enlarged view of one partition circled at A in FIG. 3.

The filter bag shown in FIGS. 1 to 4 comprises two layers L1,L2 of gas permeable of synthetic fibrous material secured together to provide a bag having elongate filter elements, i.e. cells or pockets P which are shown in FIG. 2. The side walls may be formed of any suitable synthetic fibre material or blend of materials. One example is polypropylene. The material may be treated, e.g. with an antimicrobial agent to resist microbial mould growth and build up of moulds or mildews. The two layers are sealed together along three sides by double seals S1, as a result of which the pockets are closed at their bottom or distal ends Pb but open at their mouths Pm. As shown in FIG. 1 the bag is generally rectangular as seen in plan. The pockets have a generally rectangular open inlet or mouth Pm, (except for the end ones Pe where they tend to be more triangular because of the way the two layers L1,L2 are joined together).

Figure 5:
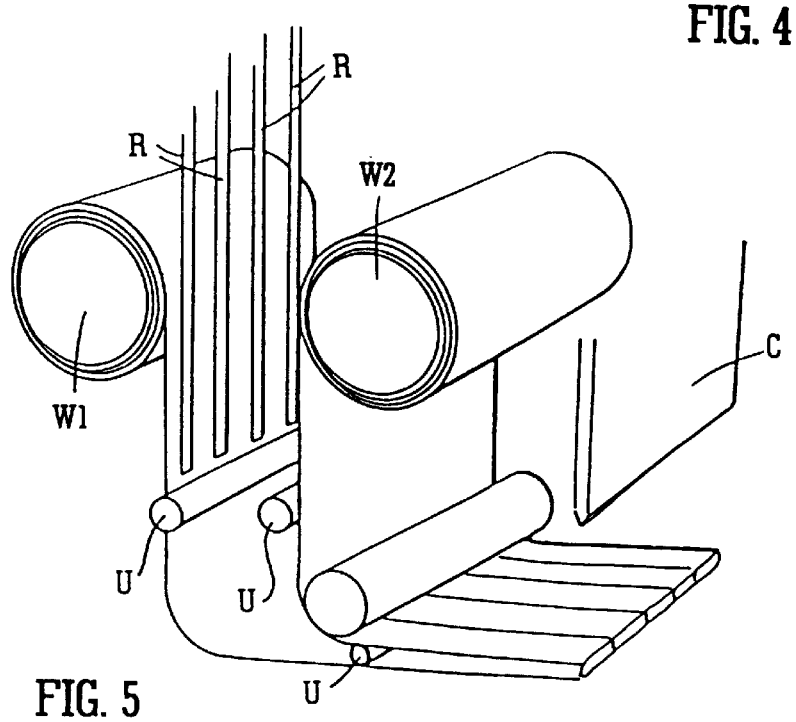
FIG. 5 shows a flow diagram for one continuous method of manufacture of a pocket of the filter bag.
Figure 6:
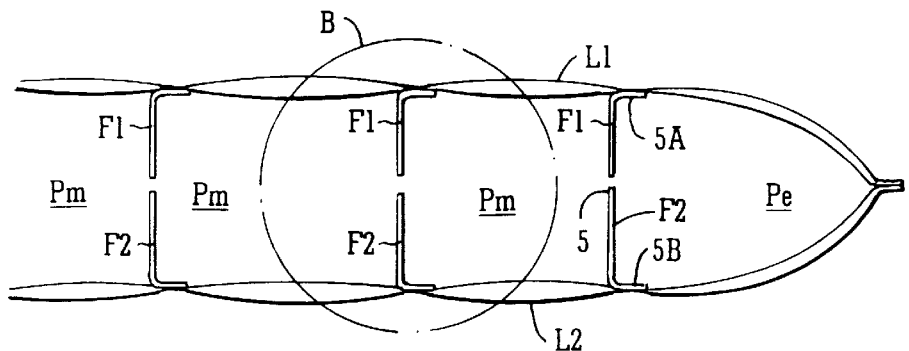
FIG. 6 is a partial front elevation of another filter bag of the invention.
Figure 7:
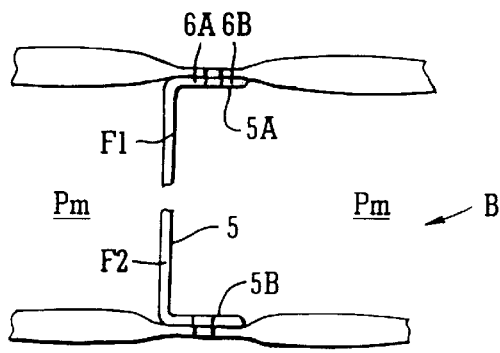
FIG. 7 is a view of one partition circled at B in FIG. 6.
Figure 8:
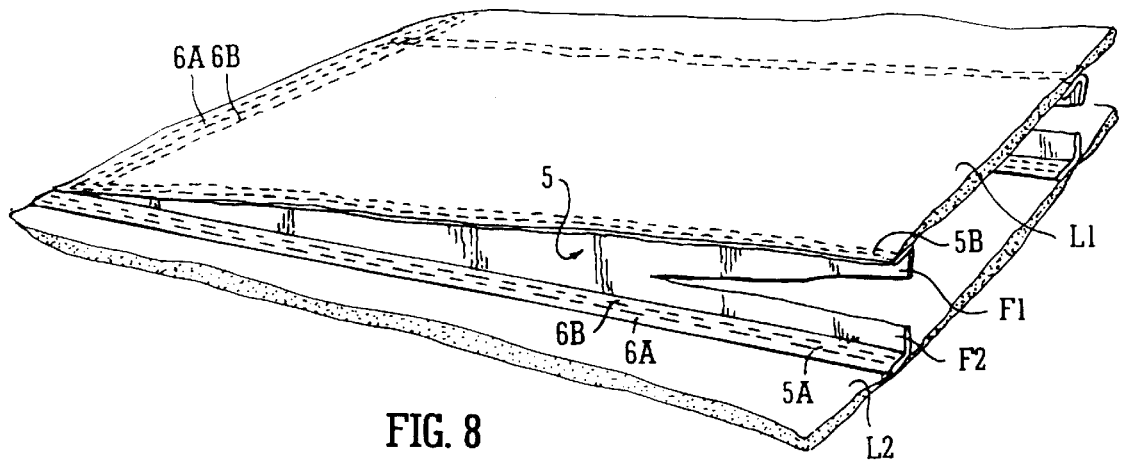
FIG. 8 is a perspective view showing part of the mouth of the bag in the open condition.

According to the invention individual pockets contain partitions 5 to form pocket portions. The partitions 5 are made of webs of fusible natural or synthetic sheet material such as polypropylene. The marginal portions 5a,5b are sealed to the inside surface of the layers L1,L2 respectively. The partitions 5 extend the full distance from the front to the rear of the bag so that as shown in FIG. 1 there are parallel elongate seams S2. The bag is made in the following general way and as shown in FIG. 5.

The apparatus comprises two rolls of webs W1,W2 which are located one on each side of two ultrasonic welding units U each made up of a shoe 6 and a horn unit 7 and are fed to extend parallel to each other one on each side of the units U. Strips or ribbons R of polypropylene are fed between the webs to the units U and when the assembly is fed passed the ultrasonic welding unit fusion takes place to form the partitions 5. While one unit U is arranged to make a continuous join the other has an interruption to provide a short length portion of one edge of the partition to be formed adjacent the intended open inlet so that the formed pocket P can flex at its front end for mounting in a filter header frame. The sides of the bag precursor are sealed by other ultrasonic welding units U. The formed bag is fed passed a cutting unit C to cut an individual bag, the rear end of which is then sealed, preferably heat sealed. This process is continuous, and the parameters may easily be adjusted according to the nature of the webs, fusion temperature and time, and dimensions.

In a trial, a filter bag of the invention was tested in the filtration of dust laden air. The bag was mounted in a frame. It was easy to inflate. There was a high level of dust collection and a very low overall pressure drop. The filter resistance was controlled. The partitions 5 hold the pockets P in controlled aerodynamic configuration to ensure a uniform shape independent of the air flow. The ultrasonic bonding ensures a strong connection without holes. This eliminates leakage or bypass of the particles through such holes. It also avoids the need to seal needlepunched holes using a hot melt sealant, giving more useful filtration area. While we do not intend the invention to be limited by the following theory, our investigations show that the flow of air through the pocket is aerodynamically streamlined or laminar, so drawing more particles therein, and because each pocket is a sealed container very few if any of the particles escape. Evaluations have shown that a filter element according to the invention remains intact and dimensionally stable up to pressures exceeding 750 pa.

In the embodiment shown in FIGS. 6 to 9, the inlet end of the partition 5 is slit to form two general parallel side flaps F1,F2 sides separated by a gap. The slit extends a short distance in from the end, sufficient to give the necessary flexibility according to the strength of the materials forming the layers L1,L2 and the partition 5. The flaps are secured to the layers by the double seals 6A,6B which are ultrasonic seals. As a result, the mouth of the pocket can be open in the manner of jaws, and the engagement of the partition and the walls will not be broken.

Figure 9:
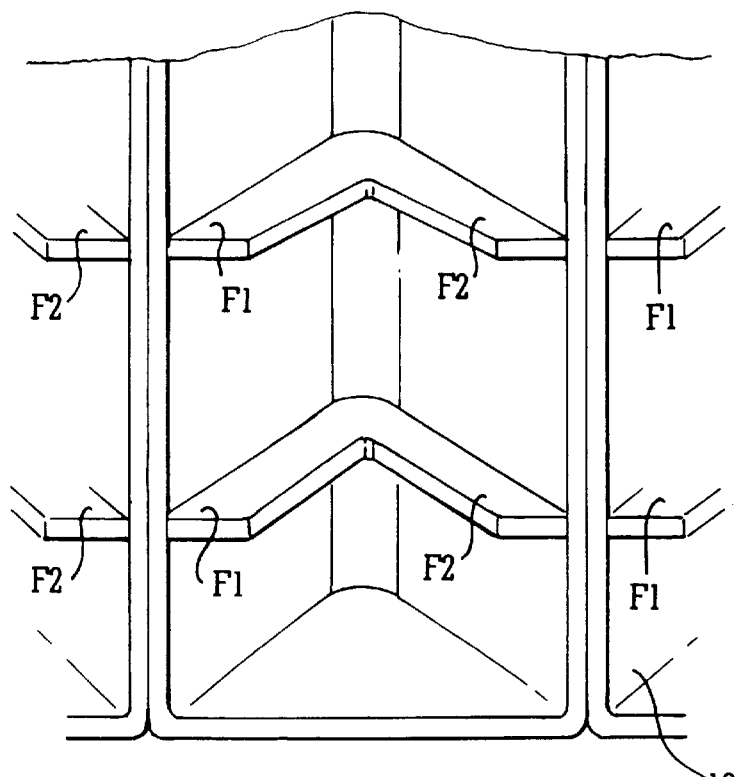
FIG. 9 is a section through a frame having pockets showing two pocket partitions.

As shown in FIG. 9, the bag is connected to a metal header or frame 10 of generally rectangular section. The front portions of adjacent pockets are crimped or otherwise secured by metal clamps to the edge of the frame. The header or holding frame may be of any suitable type, e.g. for front, rear or side withdrawal mounting. The frame may be made of metal or plastics.

The bag can be made on a continuous basis in the following way shown in FIGS. 10 and 11.

Figure 10:
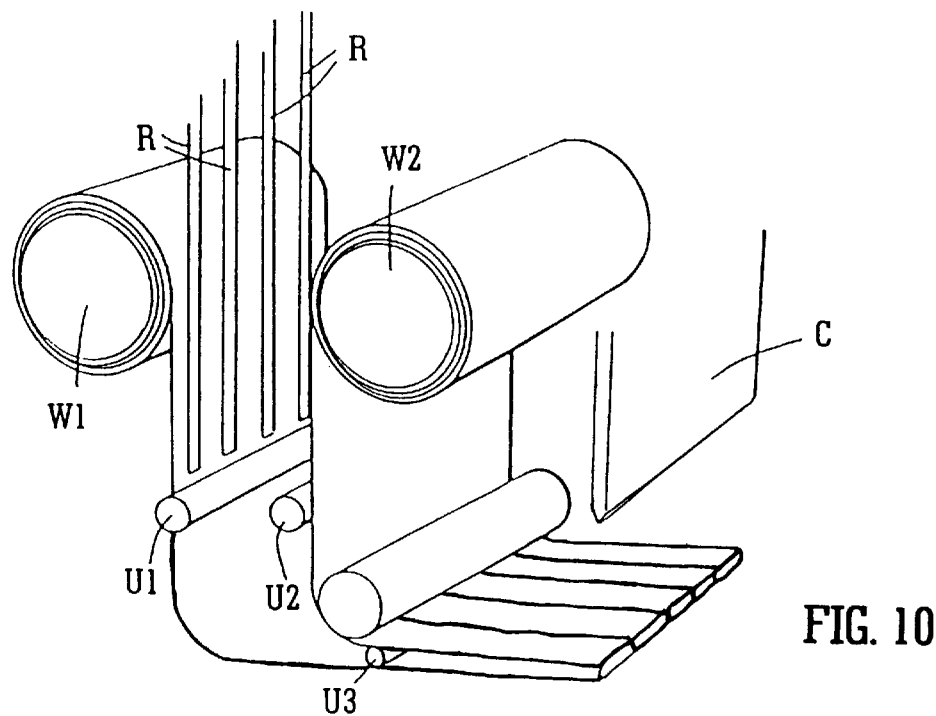
FIG. 10 shows a flow diagram for a method of continuous manufacture of a pocket of the filter bag of FIGS. 6 to 9.

The apparatus comprises parallel rod-shaped ultrasonic welding units U1, U2 and U3 each made up of a shoe and horn or anvil unit and two rolls of synthetic fibrous material W1,W2 which are located on opposite side of U1 and U2 and are fed to extend parallel to each other on opposite sides of U1 and U2 (see FIG. 10). Strips or ribbons R of polypropylene are fed between the webs W1, W2 and the units U1 and U2 to fuse both marginal edges of R to the web. The sides of the precursor are sealed by other ultrasonic welding units U3. The partly formed bag is fed passed a cutting unit C to cut an individual bag, the rear end of which is then sealed, preferably heat sealed. A marginal 5a,5b portion of each partition 5 near the upstream end of the element is then cut to introduce the longitudinal slit and form the flaps F1,F2.

Figure 11:
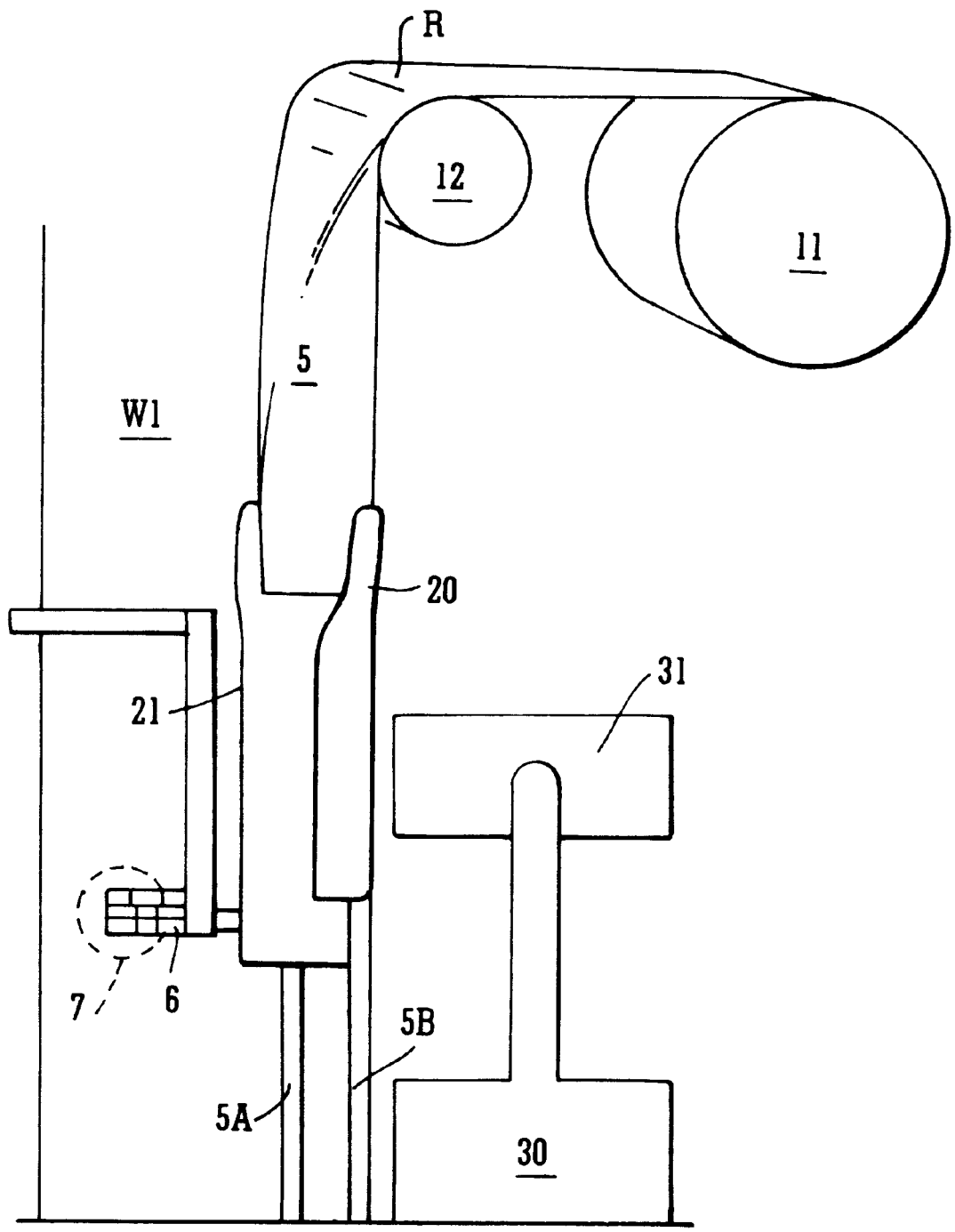
FIG. 11 shows in detail the fold up former and an ultrasonic welding unit used in the method of FIG. 10.

As shown in FIG. 11 each strip R is wound off a reel 11 over a roller 12 and fed into a former 20 the top edge of which is curved to upturn the two margins 5a,5b so that the strip is generally channel shaped. The folded up strip is then passed through the unit at the lower end of which is an ultrasonic shoe 6 in the form of a wheel having a patterned surface. The wheel 6 is on a shaft which is rotated by means of a belt drive 21. Behind the wheel is a web W1,W2 and behind that is the horn 7 of the ultrasonic welding unit in line with the wheel. As the margin 5a of the strip and the web W1 meet the shoe 6 and the horn 7 ultrasonic energy is applied to fuse them together. (In practice the web comprises an inner skin and an outer carrier surface with filter media in between; the margin 5a is fused to the inner skin). Pressure is applied by the arm 31 of a rocker 30 under pneumatic control to urge the margin 5a onto the web so that there is good contact in between. The welding must be sufficient to secure the margin 5a and the web W1 together but not so strong that either material will be torn in use or be burned by the welding. The margin 5b will be welded to its web W2 using another unit further down the line.

In a preferred embodiment, not shown, the side seals S1 are made a short distance in from the longitudinal edge from the webs and a slitter, not shown, is used to cut away the excess material which is then disposed of.

The invention also includes a method of filtration, comprising passing gas under pressure through a filter element as defined and causing or allowing the particles to collect in the filter pockets. The invention also includes apparatus for making the filter elements.

The invention is useful wherever bag filters are suitable. The invention ensures that heavyweights of dust are trapped in the filter elements over extended maintenance periods; can protect equipment in general air conditioning plant, e.g. in hospitals, communal buildings, office suites, retail outlets and the like; and reduces energy consumption because of the low initial resistance to air flow.

What is claimed is:

1. A method of making a gas filter element, the gas filter element having opposed first and second ends, and having parallel pockets extending longitudinally between the first and second ends, the method comprising:

advancing two elongated webs of synthetic fibre material to a work station to lie on opposite sides of an ultrasonic welding unit;

advancing parallel strips of fusible material to extend generally parallel to each other and to be positioned between the webs and substantially at right angles to the major axis of the webs;

passing the strips through a former to fold up parts of said strips to define longitudinal marginal portions of said strips that lie on the inner surfaces of respective webs, passing the webs and the strip marginal portions past the ultrasonic welding unit so as to ultrasonically weld said strip marginal portions to said respective webs and to so connect each of, said strips to said webs to form bridging portions in between opposite sides of said webs, and sealing side edges of said webs;

cutting across said webs and sealing the leading end portion of said webs to form a gas filter element and to separate it from said webs, said gas filter element having a first closed end and a second open end; and, forming cuts in said strips at said second open end of said gas filter for a depth sufficient to form two longitudinal side flaps of each said strip between said webs and double sealing said side flaps to said web.

2. A method according to claim 1, including the step of ultrasonic welding one marginal portion at a first ultrasonic welding unit and the other at a second ultrasonic unit, the two units being spaced apart.

3. A method according to claim 1, including the step of passing the strip through a U-shaped former to fold up both longitudinal marginal portions to make the strip generally channel shaped as seen in section.

4. A method across the claim 1, including the step of applying pressure to urge the marginal portions of the strip to the facing inner surface of the respective web.

5. A method according to claim 4, including the step of regulating the pressure between a level sufficient to make a secure ultrasonic weld connection between the marginal portion and the inner surface of the respective web and a level at which the marginal portion or the web is at risk of being burned.

6. A method according to claim 1, including the step of ultrasonic welding the longer side of the two side walls a short distance from the periphery thereof and cutting and removing the longitudinal peripheral portions.

7. A method for the production of air filter elements, comprising the steps of:

providing two elongated webs of synthetic filter material in opposition to each other;

providing a plurality of elongated strips of fusible material in a spaced-apart relationship and forming each of said strips into a channel-shaped strip having folded marginal portions that extend lengthwise of said strips;

feeding said strips between said webs in said spaced-apart relationship such that the marginal portions of said strips lie in opposition to said webs;

advancing said webs and said strips past an ultrasonic welding unit to ultrasonically weld said marginal portions of said strips to said webs and to weld together side edges of said webs together to form a continuous filter extent;

separating an individual filter element from said continuous filter extent by cutting across a width of said continuous filter extent; and sealing a leading edge portion of said filter element to form a leading closed end of said filter element while leaving a trailing end of said filter element open, said strips extending longitudinally between said leading and trailing ends of said filter element;

forming longitudinal slits in said strips between said marginal portions thereof extending from said trailing open end of said filter element for a preselected distance to define an open jaw portion for each of said strips, each open jaw portion being flanked by a pair of side flaps; and, double welding said side flaps to said webs to prevent tearing of said strips at said open jaw portions.

* * * * *